United States Patent [19]

Woodruff et al.

[11] Patent Number: 5,782,381
[45] Date of Patent: Jul. 21, 1998

[54] CONTAINER FOR CARRYING AND DISPENSING LIQUID AND SEMI-LIQUID PRODUCTS

[75] Inventors: Keith F. Woodruff, Mountainside; Donald E. Bradley, Allendale, both of N.J.

[73] Assignee: American Cyanamid Company, Madison, N.J.

[21] Appl. No.: 164,295

[22] Filed: Dec. 9, 1993

[51] Int. Cl.$^6$ .................................................. B67D 5/60
[52] U.S. Cl. ........................ 222/23; 73/327; 222/131; 222/143; 222/183; 222/377
[58] Field of Search ...................... 222/131, 143, 222/183, 377, 382, 383, 464, 464.7, 383.1, 23; 73/327

[56] References Cited

U.S. PATENT DOCUMENTS

| | | | |
|---|---|---|---|
| 1,993,255 | 3/1935 | Baggett et al. | 222/377 X |
| 2,554,557 | 5/1951 | Brown et al. | 73/327 |
| 2,786,607 | 3/1957 | Moore et al. | 222/183 |
| 2,818,201 | 12/1957 | Peck | 222/382 |
| 3,442,127 | 5/1969 | Nichols | 73/327 |
| 3,447,375 | 6/1969 | Fox, Jr. | 73/327 |
| 3,543,581 | 12/1970 | Ryder | 73/327 |
| 3,910,461 | 10/1975 | Eager | 222/131 |
| 4,398,653 | 8/1983 | Daloisio | 222/143 X |
| 4,557,406 | 12/1985 | Olinger et al. | 222/377 X |
| 4,746,034 | 5/1988 | Ata et al. | 222/143 |
| 4,960,227 | 10/1990 | Coleman | 222/131 X |
| 5,110,013 | 5/1992 | Clark et al. | 222/382 |
| 5,163,485 | 11/1992 | Hermann | 222/183 X |
| 5,275,313 | 1/1994 | Petrillo et al. | 222/377 |

FOREIGN PATENT DOCUMENTS

| | | | |
|---|---|---|---|
| 464056 | 11/1968 | Switzerland | 222/143 |

*Primary Examiner*—Kevin P. Shaver
*Attorney, Agent, or Firm*—Mark P. Stone

[57] ABSTRACT

A container for carrying and dispensing liquid and semi-liquid products includes an inner product tank received within an outer protective tank. The inner tank receives the liquid or semi-liquid product to be transported from one location to another, while the outer tank protects the inner tank from punctures and other damage during transport of the container, and during discharge and refill of product in the inner tank. The outer tank has downwardly extending support legs, which enable separate containers to be stacked atop each other. The support legs of the outer tank transfer the stacking load from the top surface to the bottom surface of the outer tank legs and for reducing load stresses on the inner tank holding the liquid or semi-liquid product. The inner and outer tanks cooperate with each other to facilitate drainage and cleaning of the inner tank, and for protection of a product pump including a discharge hose, while one or more tanks are stacked atop each other during transit. A sight window on the surfaces of the inner and outer tanks, and a product tube extending into the inner tank, provide an observable indication of the quantity of product remaining in the inner product tank. The container provides a system for safely and efficiently transporting liquid and semi-liquid products together with the equipment necessary for selectively discharging the product from the container at the desired location.

16 Claims, 7 Drawing Sheets

CONTAINER FOR CARRYING AND DISPENSING LIQUID AND SEMI-LIQUID PRODUCTS

BACKGROUND OF THE INVENTION

The present invention relates to containers for carrying and dispensing liquid and semi-liquid products, and in particular hazardous products.

It is axiomatic that hazardous liquid products, including agricultural treatment agents such as herbicides, pesticides, fertilizer and the like, must be safely transported from one location to another. Liquid and semi-liquid products of this type are commonly transported from supply or filling stations to locations in which the materials are to be dispensed for application to areas to be treated, in containers carried on trucks or trains. It is important that the products within the containers be well protected in transit, and that the containers be of sufficient strength and construction to avoid puncture or rupture during transportion, particularly in the event of accident. It is also important that the containers be designed to be capable of being transported in an economical and efficient manner.

It is the primary object of the present invention to provide an improved container for storing, transporting, and dispensing liquid and semi-liquid products, particularly so-called hazardous products, in a safer and more economical and efficient manner than is presently available by the known conventional containers. Further objects of the invention are to provide a container which is designed to facilitate cleaning and drainage thereof, and a container including means for storing discharge equipment including a pump and discharge hose while the tank is being transported. A further object of the present invention is to provide simple means for indicating the quantity of product remaining within the container by visual observation therein. Other objects and advantages of the present invention will become apparent from the following description and discussion of the invention in conjunction with the accompanying drawings.

SUMMARY OF THE INVENTION

The container system in accordance with the present invention includes a first inner container for receiving and holding a liquid or semi-liquid product to be stored, transported and discharged by the container system. The inner tank is received within an outer tank which is provided to protect the the inner tank and the product stored therein from punctures, ruptures and other structural damage which might otherwise result in leakage or unintended discharge of the product. The inner and outer tanks have spherical contoured upper and lower surfaces to facilitate product drainage from the inner tank and maintenance and cleaning thereof. A plurality of vertical support legs extend downwardly from the outer tank, and the support legs are received within complementary retaining elements extending upwardly from the top surface of another outer tank to permit stacking of one container atop another. The support legs extending from the bottom of the outer stacked tank tend to transfer the stacking load from the top surface to the bottom surface of the outer tank legs to remove the stacking load and stresses from the inner product tank to thereby further protect the liquid or semi-liquid material within the inner tank. The inner and outer tanks are configured to define a recess or well at the top of the container to accomodate a pump for discharging material from the inner container through a discharge tube. The recess or well also provides a compartment space for storing the pump and the coiled discharge tube in an inoperative carrying position when a plurality of separate containers are stacked atop each other and are being transported from one location to another. The inner and outer tanks of the container system further define a selectively closable fill port on the top surface of the container to refill the inner tank with product as needed. The inner and outer tanks also include transparent sight windows in alignment with each other on the top surface of the container, and a sight tube extending into the inner container and in alignment with the sight windows, to enable a user to readily observe an indication of the level of product remaining within the inner tank.

The container system in accordance with the present invention provides safe, strong and durable means for protecting liquid and semi-liquid product within the container during storage, transportation and discharge operations. The container also provides efficient, economic and safe stacking of one container atop another during storage and transportation. Discharge means used with the container, such as pumps and related equipment, may also be safely and economically stored and transported with the stacked containers.

DESCRIPTION OF THE BEST MODES FOR CARRYING OUT THE INVENTION

Figure 1:
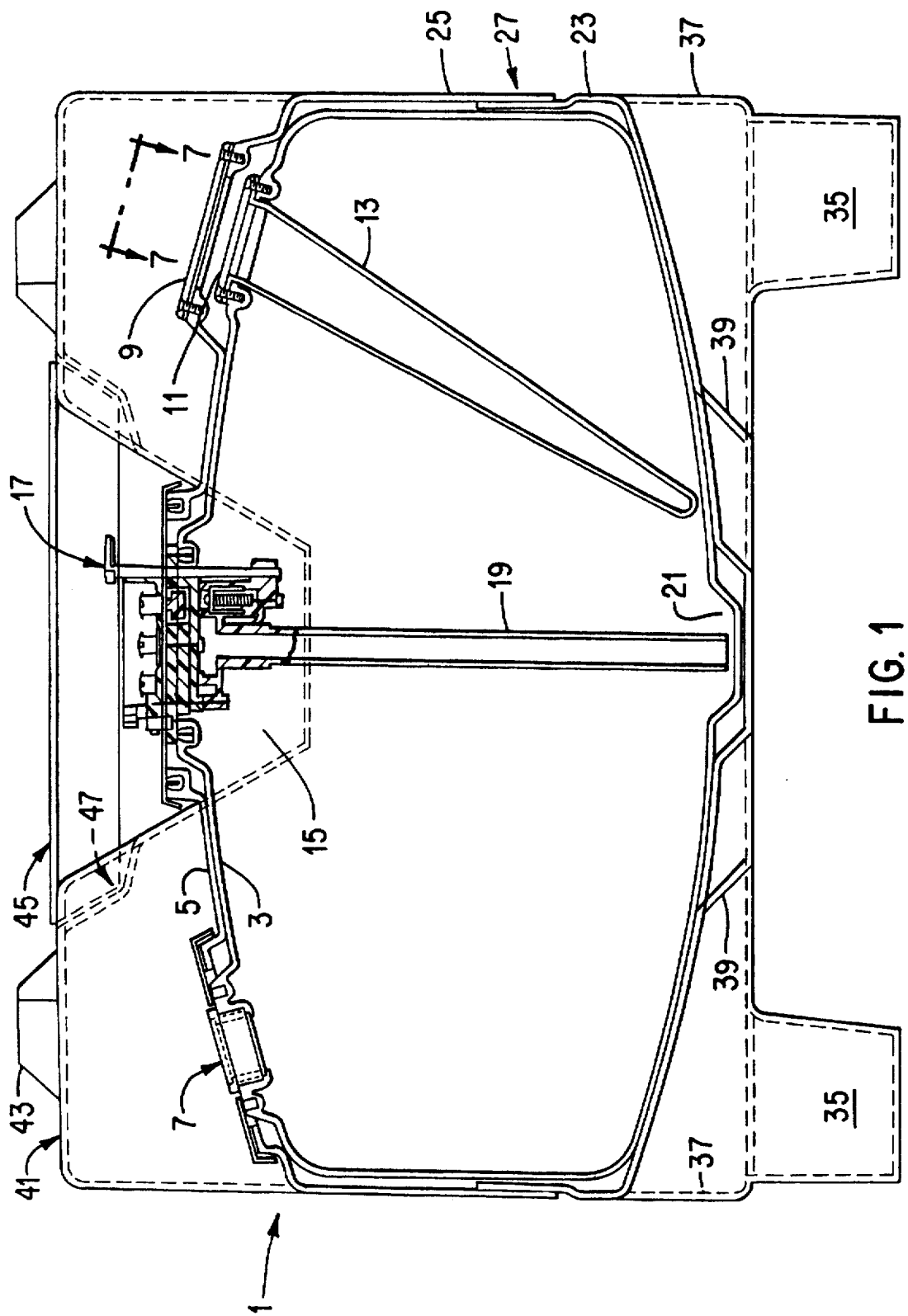
FIG. 1 of the drawing illustrates an elevational view, in section, of a container in accordance with the present invention, including a pump and discharge hose mounted thereto in an operative position.

FIGS. 1–7 of the drawing illustrate the preferred embodiment of a container for carrying and dispensing liquid and semi-liquid products in accordance with the present invention. The container, which is particularly useful in connection with storing, transporting and dispensing materials such as hazardous liquid products where additional product protection is required, is designed to provide a safer, stronger and more durable structural design for storing and transporting product, and also includes the capability of stacking separate containers atop each other for more economical transportation and storage of multiple containers (both with and without product contained therein).

Referring first to FIG. 1 of the drawing, the container in accordance with the present invention is generally designated by the reference numeral 1. The container 1 is formed from an inner tank generally designated by the reference numeral 3, and an outer tank generally designated by the reference numeral 5. The inner tank 3 is provided for receiving, storing and transporting liquid or semi-liquid product to be dispensed therefrom, and the outer tank 5 surrounds the inner tank 3 to provide protection for the inner tank and the product contained therein. The inner tank 3 and the outer tank 5 include cooperating structure for providing a fill port, designated generally by reference numeral 7, on a portion of the top surface of the container. Fill port 7 provides access to the inner container through the outer container for supplying liquid or semi-liquid product to the inner container. The structure of the inner and outer tanks also cooperate at a separate region on the top surface of the container, preferably on a portion of the top surface of the outer tank opposed to the location of the fill port 7, to provide a pair of aligned sight windows 9 and 11. The sight windows are formed from a durable transparent material, as for example, lucite, and permit an observer looking downwardly into the container from above the top surface of the outer tank 5 to visually observe the contents of the inner tank 3. A sight tube 13 is mounted to the side portions of the sight window 11 on the top surface of the inner tank 3, and extends downwardly and inwardly into the space defined by the inner tank. As will be discussed in further detail below, the sight tube, in cooperation with the aligned sight windows on the inner and outer tanks, provide simple and efficient means for visually observing the content of product remaining within the inner tank without affecting the integrity of the closed container system or otherwise requiring direct contact with the product within the inner tank.

The top surface of the inner and outer tanks also provide a space or compartment, generally designated by reference numeral 15, for accommodating a pump 17 having a discharge tube 19 extending downwardly into the inner container 3 for selectively discharging product received therein as a result of operation of the discharge pump. The remote end of the discharge tube 19 is received within a well 21 defined by a downwardly directed recessed portion in the proximate center region of the bottom surface of the inner tank 3. The sides of the bottom surface of the inner tank adjacent to the well 21 are inclined in a direction towards the well to cause product flow into the well to facilitate discharge of the product through the remote end of the discharge tube 19 extending into the well.

The inner and outer tanks are formed from conventional materials, including durable plastics. The outer tank is peferably formed from high density polyethylene while the inner tank is preferably made from cross-linked high density polyethylene. The containers are preferably produced by conventional manufacturing processes, as for example, molding. As will be discussed further below, the outer container in accordance with the present invention is initially manufactured as a unitary structure and thereafter modified to provide a slip fit between separate upper and lower outer container sections cut from the initial piece.

Figures 3A, 3B:
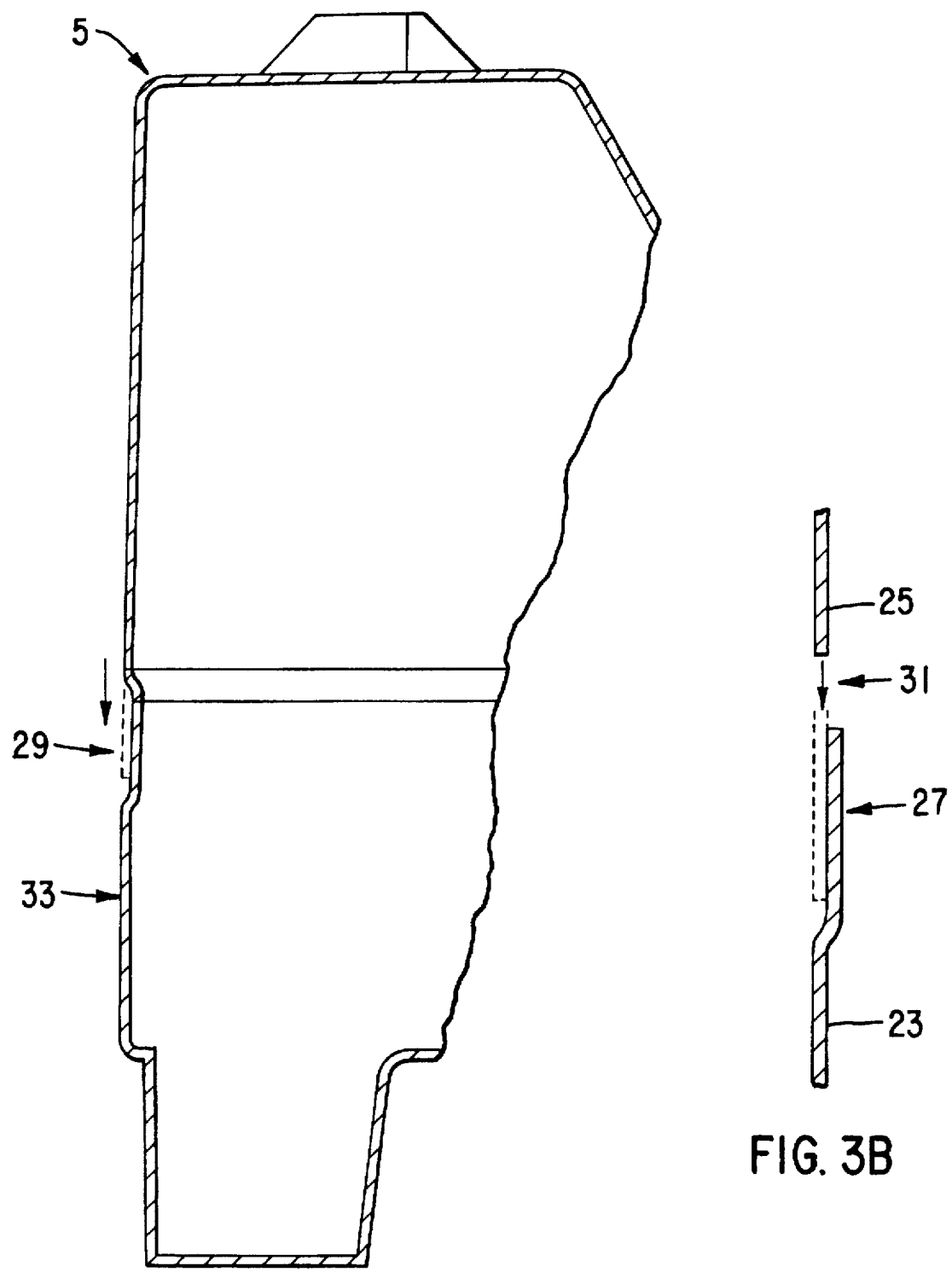
FIG. 3 illustrates a portion of the outer tank of the container manufactured in accordance with the present invention, showing the manner in which an upper portion of the outer tank is joined to a lower portion of the outer tank.

Still referring to FIG. 1 of the drawing, the outer container 3 is formed from a lower section 23 and an upper section 25. The lower and upper sections are designed for slip fit engagement into each other in the region designated generally by reference numeral 27, to provide a closed outer tank structure 5 which is selectively openable by separating the upper tank section 25 from the lower tank section 23 to permit the inner tank 3 to be received selectively within the outer tank 5 or to be selectively removed from the outer tank 5. As illustrated by FIG. 3 of the drawing, the outer tank 5 is originally molded as a single piece to provide an inwardly directed recess area 29 defined near the midpoint of its vertical sidewall 33, and thereafter cut in the manner schematically illustrated by reference numeral 31 to result in a slip fitting relationship between the upper section 25 and the lower section 23 of the vertical sidewall 33 of the outer tank 5.

Figure 4:
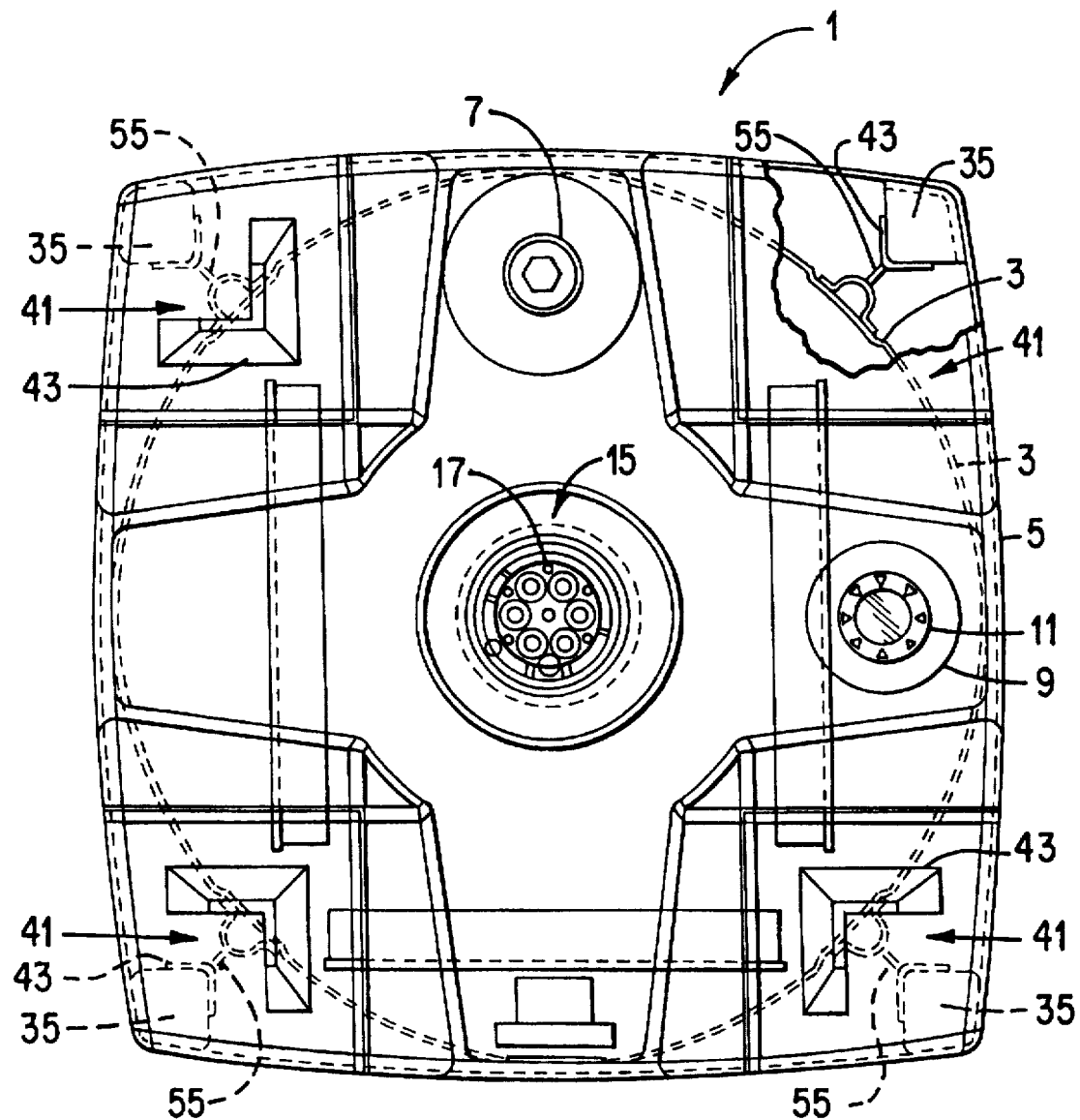
FIG. 4 illustrates a top plan view, partially in section, of the container in accordance with the present invention.
Figure 6:
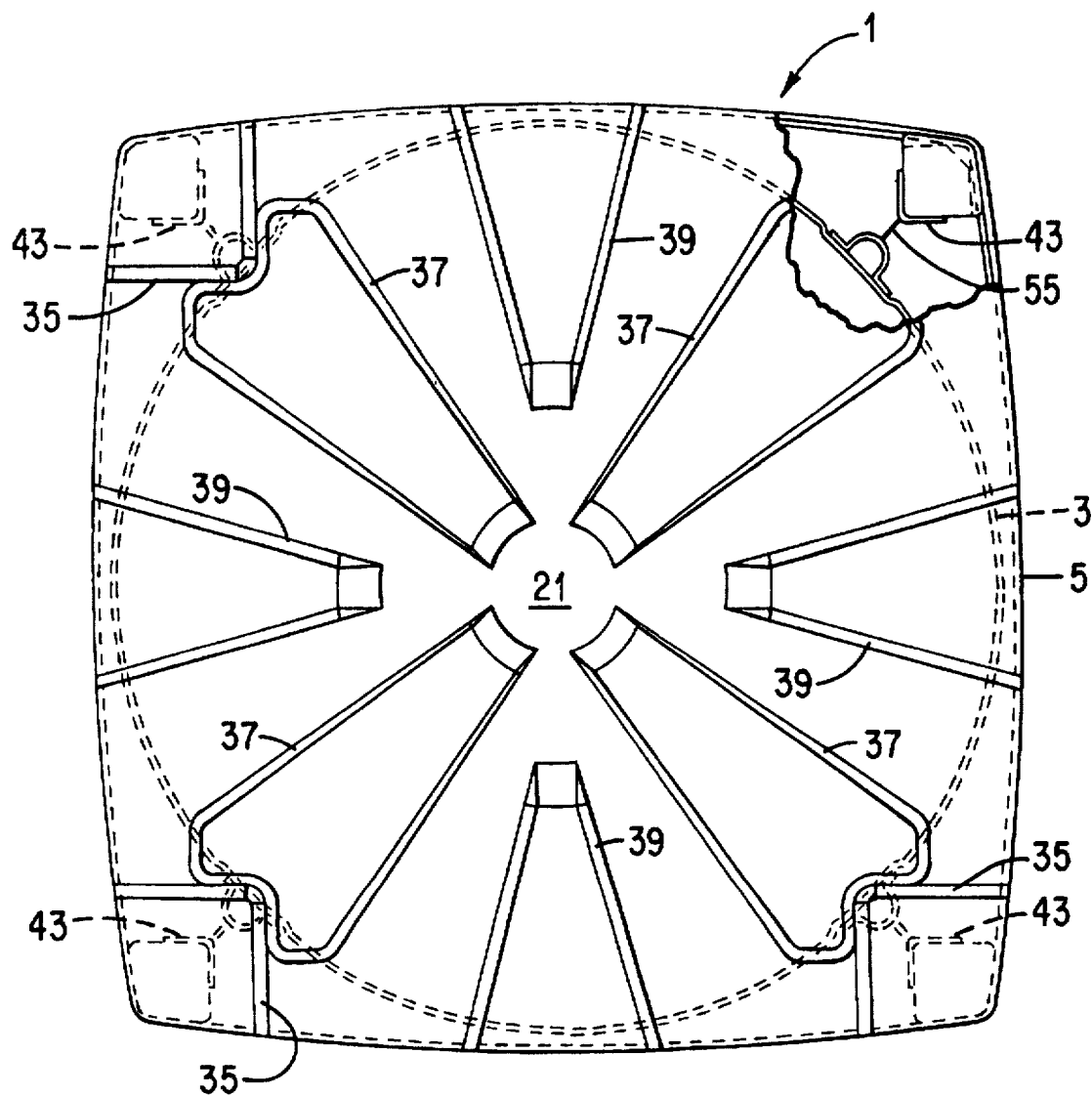
FIG. 6 is a bottom plan view, partially in section, of the container illustrated by FIG. 1 in accordance with the present invention.

As illustrated in FIG. 1, a plurality of legs 35 extend downwardly from the bottom corners of the outer tank 5 to provide support for both the inner and outer tanks 3 and 5, and the overall container system 1. The supporting legs 35 are mounted to the bottom surface of a section 37 which itself extends from the lower section 23 of the outer tank 5. Supporting elements 39 are provided for spacing and further securing the inner and outer tanks 3 and 5 and the supporting legs 35 to further protect the inner tank 3 and the product contained therein from damage. As shown in FIGS. 4 and 6, the supporting legs 35 preferably extend downwardly from each of the four corners of the bottom surface of the container 1.

The top surface of the container 1 defines four upwardly extending elements or platforms 41 at the corners of the container. Each of the upper corner platforms 41 includes a raised element 43 extending from the upper surface of the platform 41. The raised element 43 is provided for engaging a complementary configured section on a lower supporting leg of a separate container to prevent shifting or other relative movement of the second container relative to the first container when the second container is stacked atop the first container 1 during transport or storage of a plurality of containers having the same structure as container 1.

Figure 5:
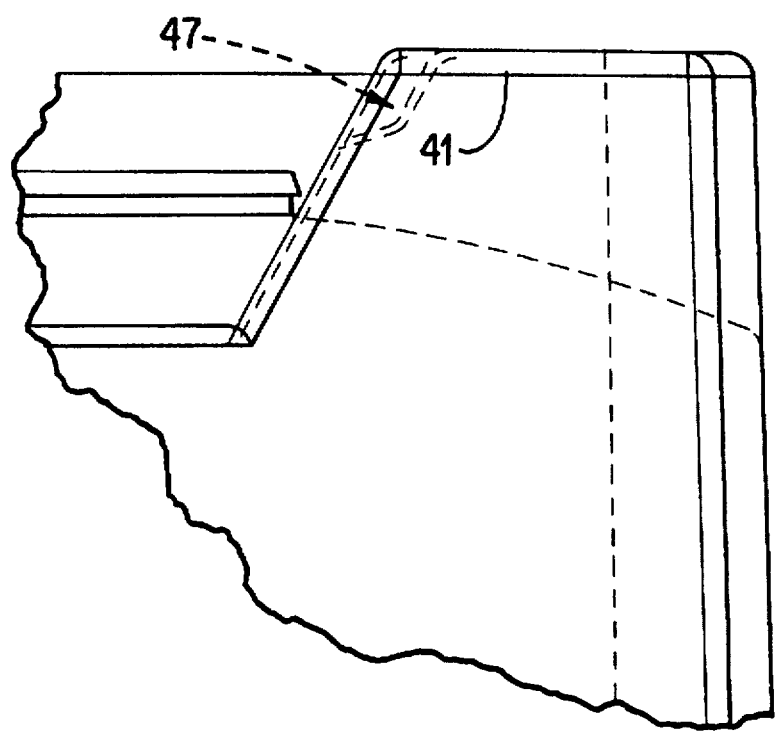
FIG. 5 illustrates in partial elevational section, an upwardly protruding portion of the corner section of the outer container provided for stacking a separate container thereon.

The corner elevated platform sections 41 extending upwardly from the top surface of the container 1 define the centrally disposed recessed compartment or well 15 which, as previously discussed, accommodates the discharge pump 17 in its operative position. A bracket support 45, preferably formed from a durable metal, is mounted above the compartment 15. Recessed areas on a portion of the inner surfaces of the upwardly extending platform elements 41 define a slot for retaining the bracket support 45 above the compartment 15. It is noted that the space defined by the compartment 15 is covered by the bracket 45 which provides a closed area for receiving both the pump and a coiled product delivery hose in a protected, storage position to enable transport of the discharge pump and the hose together with the container 1. FIG. 5 illustrates, in vertical section, a recessed portion 47 defined on the inner surface of the elevated platform 41 for receiving the supporting bracket 45 mounted atop the recessed compartment 15 centrally disposed on the top surface of the container 1.

Figure 2:
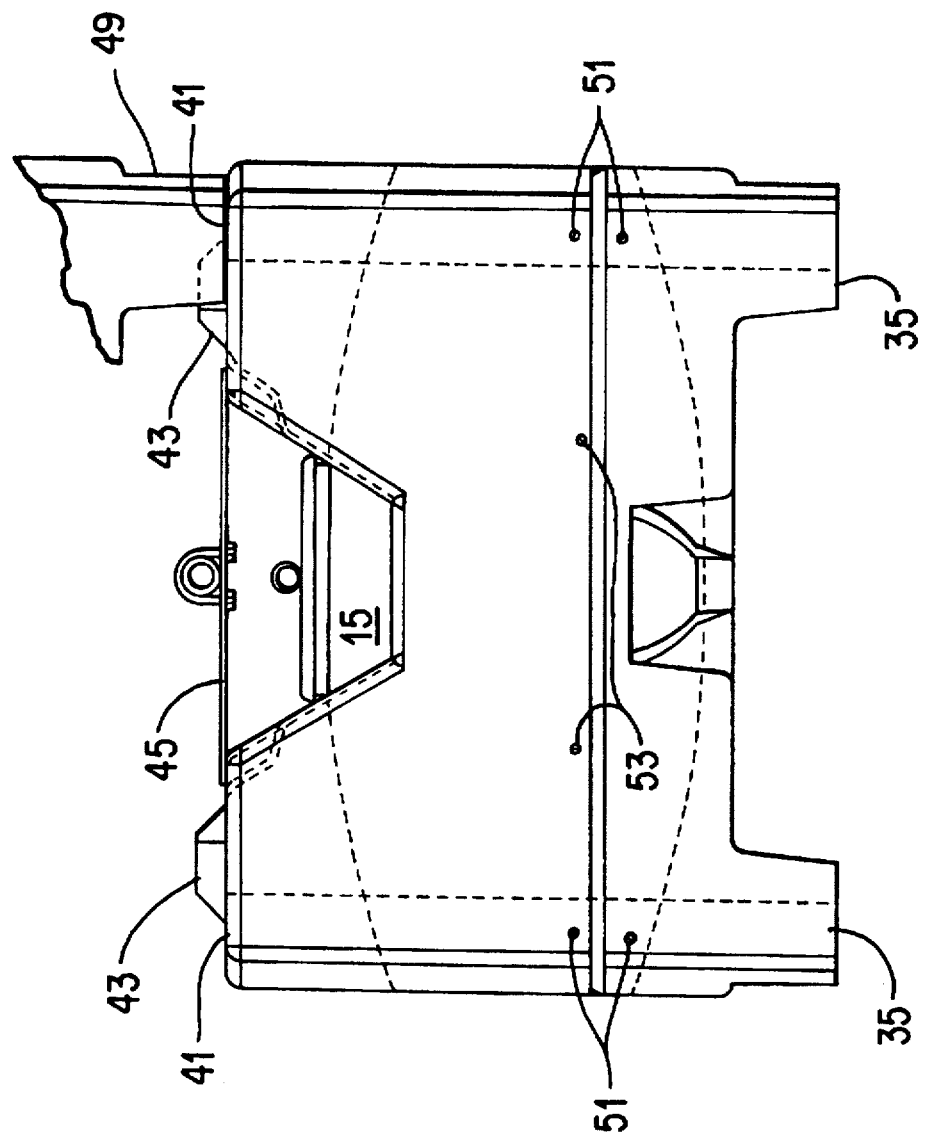
FIG. 2 illustrates a side elevational view of the outer tank of the container shown by FIG. 1.

FIG. 2 illustrates a side elevational view of the container 1 in accordance with the present invention, principally showing the stuctural features of the outer tank 5. Elements of FIG. 2 which correspond to like elements of other drawing figures have been designated with the same reference numerals. The drawing of FIG. 2 illustrates the supporting legs 35 extending downwardly from the bottom corner surfaces of the outer tank of the container, and further illustrates the platform 41 extending upwardly from the corners of the container corresponding to those carrying the downwardly supporting legs 45. The raised elements 43 extend upwardly from the top surfaces of the platform 41, and FIG. 2 schematically illustrates a lower leg 49 extending downwardly from a separate container 1 stacked atop the container illustrated by FIG. 2. As illustrated in the drawing, the leg of the stacked container is supported on the upper surface of the elevated platform 41 and is engaged by the raised element 43 to prevent shifting of the upper container relative to the lower container when it is stacked on the lower container. FIG. 2 further illustrates a plurality of self-tapping screws 51 received within the support legs 35 of the container to secure the legs to the lower section of the outer tank, and a plurality of self-tapping screws 53 for removably securing the top section 25 of the outer tank to the lower section 23 of the outer tank at the junction 27 where the top and bottom sections of the outer tank are joined in a slip fitting engagement relationship (See FIG. 1).

FIG. 4 of the drawing illustrates a top plan view, partially in section, of the container illustrated by FIG. 1. Corresponding elements have been designated by the same reference numerals. FIG. 4 illustrates the four elevated platform elements 41 defined at the top four corners of the upper surface of the container 1. The raised elements 43 extending upwardly from each platform 41 are "L-shaped" to receive a portion of a complementary shaped leg extending downwardly from an upper container stacked atop the top surface of the illustrated container. The elevated sections 43 defined in the corners of the top surface of the container are substantially aligned with the four supporting legs 35 extending downwardly from corresponding corners of the bottom surface of the same container. The corner sections of the container corresponding to the elevated platform sections 41 and the downwardly extending supporting legs 35, also include spacer elements 55 acting against the outer surface of the vertical sidewall of the inner tank 3. The spacer elements prevent the inner tank from shifting laterally relative to the outer tank, and provide additional structural support to the sidewall of the inner tank which contains the product to be transported or dispensed.

As also illustrated in FIG. 4 of the drawing, the transparent sight windows 9 and 11 on the outer and inner tanks respectively (See FIG. 1), are defined on the upper surface of the container between two adjacent elevated corner platforms 41. Similarly, the fill port 7 (See FIG. 1) is also defined on the upper surface of the outer tank of the container between two adjacent elevated corner platforms 41. FIG. 4 further illustrates that the recessed area defining the compartment 15 (See FIG. 1) for receiving the discharge pump 17, is centrally disposed on the top surface of the outer tank 5 of the container 1.

FIG. 6 of the drawing illustrates a bottom plan view, partially in section, of the container illustrated by FIG. 1 of the drawing. In particular, FIG. 6 more clearly illustrates the centrally disposed recess or well 21 defined on the bottom surface of the inner tank of the container, the supporting elements 39 extending from the lower surface of the outer tank, and the supporting elements 37 carrying the corner supporting legs 35 extending downwardly from the bottom surface of the outer tank. As discussed with respect to FIG. 1, the bottom surface of the inner product tank 3 is downwardly inclined in a direction towards the geometrical center thereof to enhance product flow, as a result of gravitational forces, into the center well 21. In this manner, liquid and semi-liquid products within the inner tank will accumulate in the central well 21 proximate to the inlet end of the tube 19 coupled to the discharge pump 17 for efficient discharge of product from the container system. Additionally, accumulation of product in the center well 21 enables the inner tank to be more efficiently drained of product during normal maintenance and cleaning procedures. As also illustrated by FIG. 6, the corner supporting legs 35, which extend downwardly from the bottom surface of the outer tank, are in substantial alignment with the corner elevated platforms carrying the raised elements 43 extending upwardly from the top surface of the outer tank.

Figure 7:
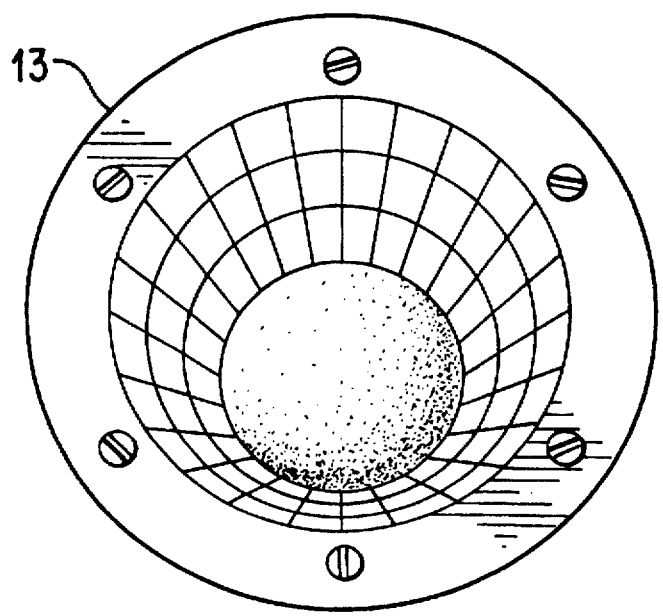
FIG. 7 is a perspective view as seen by an observer looking down the sight tube of the container in accordance with the present invention to determine the content of product remaining within the inner tank.

FIG. 7 of the drawing illustrates a view looking downwardly into the sight tube 13 through the aligned transparent sight windows 9 and 11 provided on the top surfaces of the inner and outer tanks 3 and 5, as illustrated by FIG. 1. The sight tube 13 extends downwardly into the inner product tank, substantially from its top surface to its bottom surface. The diameter of the sight tube is continuously tapered inwardly in a direction from top to bottom. The sight tube is formed from a transparent material, and includes gradient markings on the inside of the tube at different distances away from its upper base. Accordingly, the gradients correspond to the distances that the marked sections of the tube extend into the inner product tank (i.e., away from the top surface of the inner tank), and thus correspond to different elevations of product level within the inner tank. If the product within the tank is opaque or dark, the observer will be able to determine the product level by reading the indicia on the inner surface of the sight tube corresponding to the level of product within the inner container. The indicia marked on the inner surface of the product tube may correspond to different quantities of product content remaining within the container, as for example, "full", "three quarters full", "one half full", and "one quarter full", or other suitable designations.

The container described and illustrated by FIGS. 1–7 advantageously provides means for safely and economically storing, transporting and discharging liquid and semi-liquid product, particularly hazardous liquid product requiring additional product protection. The supporting legs of the container, which extend downwardly from the bottom surface of the corners of the container, provide structural integrity to the overall container system. The legs enable stacking of individual containers atop each other, and advantageously divert the load/stress in a vertical plane—i.e., in a lateral direction. In this manner, the weight of a container, including a loaded product tank, and/or the weight/stress on a container as a result of the loaded product within the container and additional containers stacked atop a container, is not applied directly to the container itself but is diverted to the supporting legs and thus applied along a vertical plane. The upwardly projecting platforms extending from the top corners of the upper surface of the outer tank are substantially aligned with the supporting legs extending downwardly from the corners of the bottom surface of the outer tank to assure that the load of a stacked container applied to the upper corner projections is transmitted and absorbed by the lower supporting legs, and not the inner product tank. Moreover, the spacer elements provided between the vertical sidewalls of the inner and outer tanks along the corner sections of the container, in addition to separating and protecting the inner product tank from the outer protective tank as discussed herein, tend to absorb the stacking load stress applied laterally from the upwardly extending platforms in a vertical plane towards the downwardly supporting legs. Thus, these wooden inserts or spacer elements tend to reinforce the supporting legs and absorb the lateral load and stresses applied thereto from the product within the inner tank and the load and stresses applied to the lower container by an upper container stacked thereon.

The inner product tank is further protected by the removable surrounding outer tank, which, in addition to reinforcing the inner tank from external stresses and loads, provides structural protection to further insulate and isolate the inner tank from punctures and other potential structural damage occurring during storage and transport of product.

Accordingly, the container system designed in accordance with the present invention provides protection for the product to be carried, stored or transported within the inner product tank from both punctures and structural damage, and further reinforces and protects the inner product tank from external loads and stresses including those applied by other stacked containers. The double tank design provides enhanced structural integrity from physical damage to the inner product container, while other design features of the invention (including the raised upper corner projections and the corresponding downwardly extending corner supporting legs) divert the application of external loads and stresses away from the inner product tank. The container system in accordance with the present invention is particularly useful for the efficient, economic and safe handling of hazardous liquid and semi-liquid product.

Other advantages of the container system in accordance with the present invention include the well defined on the central bottom surface of the inner container to faciliate product discharge through the discharge tube of the discharge pump, and to collect residue product to facilitate normal cleaning and maintenance procedures; the upper recessed area defined in the top surface of the container for receiving the discharge pump during operation thereof, and for storing the discharge pump and related discharge coil when the container is being stored or being transported from one location to another; and the provision of aligned sight windows and a corresponding sight tube extending into the inner product tank to enable an observer to readily determine the quantity of product remaining within the container system without directly contacting or otherwise affecting the product within the inner tank.

Other advantages within the scope of the present invention will become readily apparent to those skilled in the art.

Accordingly, the description of the preferred embodiment of the invention herein is intended to be illustrative only and not restrictive of the scope of the invention, that scope being defined by the following claims and all equivalents thereto.

We claim:

1. A container for storing, transporting and dispensing liquid and semi-liquid product, said container comprising:
   a first inner tank for receiving and holding said product,
   a second outer tank for removably receiving therein said first inner tank,
   port means in said container for supplying said product to said inner tank,
   discharge means for selectively discharging said product in said inner tank from said container, a plurality of supporting legs extending downwardly from a bottom surface of said outer tank of said container,
   a plurality of projections extending upwardly from an upper surface of said outer tank, said projections being provided for supporting another container in stacked relationship atop said projections,
   each of said plurality of projections defining a top upper surface, and each of said plurality of projections including a raised element extending upwardly from said top surface, said raised element engaging a portion of a stacked container to retain said stacked container in a predetermined position relative to said top upper surface.

2. The container as claimed in claim 1 wherein said discharge means includes a discharge port in said container.

3. The container as claimed in claim 2 wherein said discharge means includes a recessed portion in a top surface of said outer tank of said container for receiving a discharge pump, said discharge port being defined in said recessed portion.

4. The container as claimed in claim 1 wherein a bottom surface of said inner tank defines a recessed portion.

5. The container as claimed in claim 4 wherein said recessed portion is defined substantially in the center of said bottom surface of said inner tank, said bottom surface of said inner tank being inclined downwardly towards said recessed portion for causing product flow into said recessed portion as a result of gravitational forces.

6. The container as claimed in claim 1 wherein each of said plurality of projections is substantially aligned with each of said plurality of supporting legs.

7. The container as claimed in claim 6 wherein said container has four corner sections, each of said corners of said container having one of said plurality of projections extending upwardly therefrom and one of said supporting legs extending downwardly therefrom.

8. The container as claimed in claim 1 wherein said outer tank is formed from an upper and a lower section, and means for removably joining said upper and lower sections together.

9. The container as claimed in claim 8 wherein said upper and lower sections of said outer tank are connectable along a portion of a sidewall of said outer tank, one of said sections having an inwardly directed recessed portion and the other of said sections being in said recessed portion in a slip fitting engagement.

10. The container as claimed in claim 1 further including means for indicating the quantity of said product in said inner tank, said means for indicating including a translucent tapered tube-like element extending into said inner tank.

11. The container as claimed in claim 10 wherein said means for indicating further includes a first transparent window in said outer tank, and a second transparent window in said inner tank, said first and second windows and said tube-like element being in substantial alignment so that said tube-like element is observable from outside said container through said first transparent window in said outer tank.

12. The container as claimed in claim 1 wherein each of said plurality of projections is substantially aligned with each of said plurality of supporting legs.

13. A container for liquid and semi-liquid product, said container comprising:
   a first inner tank for holding said product,
   a second outer tank for removably receiving therein said inner tank,
   said container including port means for supplying said product to said inner tank,
   said container including means for discharging said product from said inner tank,
   said outer tank having an upper surface and a plurality of projections extending upwardly from said upper surface,
   said outer tank having a lower surface and a plurality of supporting legs extending downwardly from said lower surface,
   said upwardly extending projections on said outer tank being substantially aligned with said downwardly extending supporting legs on said outer tank, and
   a raised element extending upwardly from each of said projections, said raised element comprising means for engaging a complementary configured portion of another of said containers stacked on said upper surface of said outer tank.

14. The container as claimed in claim 13 wherein said inner tank includes a lower surface, said lower surface defining a recessed portion thereon, said lower surface being inclined relative to said recessed portion such that said product in said inner tank is caused to flow down said lower surface and into said recessed portion as a result of gravitational forces.

15. The container as claimed in claim 13 wherein said outer tank is formed from upper and lower sections removably connected together in a slip fit engaging relationship.

16. A container for liquid and semi-liquid product, said container comprising:

a first inner tank for holding said product, a second outer tank for removably receiving therein said inner tank, said container including port means for supplying said product to said inner tank, said container including means for discharging said product from said inner tank, said outer tank having an upper surface and a plurality of projections extending upwardly from said upper surface, said outer tank having a lower surface and a plurality of supporting legs extending downwardly from said lower surface, said upwardly extending projections on said outer tank being substantially aligned with said downwardly extending supporting legs on said outer tank, and wherein a recessed portion is defined between said upwardly extending projections in said upper surface of said outer tank, said recessed portion defining a compartment for receiving a discharge pump.

* * * * *